US012726095B2

(12) United States Patent
Zhao et al.

(10) Patent No.: US 12,726,095 B2
(45) Date of Patent: Sep. 1, 2026

(54) COMPOSITE ROTORS AND METHODS OF MAKING COMPOSITE ROTORS

(71) Applicant: Hamilton Sundstrand Corporation, Charlotte, NC (US)

(72) Inventors: Wenping Zhao, Glastonbury, CT (US); Andrzej Ernest Kuczek, Bristol, CT (US); Zaffir A. Chaudhry, Portland, CT (US); Jagadeesh K. Tangudu, South Windsor, CT (US); Huan Zhang, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 226 days.

(21) Appl. No.: 18/408,410

(22) Filed: Jan. 9, 2024

(65) Prior Publication Data

US 2025/0226734 A1 Jul. 10, 2025

(51) Int. Cl.
*H02K 16/02* (2006.01)
*H02K 15/02* (2025.01)

(52) U.S. Cl.
CPC ............. *H02K 16/02* (2013.01); *H02K 15/02* (2013.01)

(58) Field of Classification Search
CPC ............................... H02K 16/02; H02K 15/02
USPC ................................ 310/114, 154.33, 156.37
See application file for complete search history.

(56) References Cited

U.S. PATENT DOCUMENTS 7,687,969 B2 3/2010 Kim et al.
7,898,134 B1 * 3/2011 Shaw .................. H02K 21/222 310/112
11,646,633 B2 5/2023 Tangudu et al.
11,811,268 B2 11/2023 Tangudu et al.
2022/0315231 A1 * 10/2022 Tangudu .................. H02K 1/27

FOREIGN PATENT DOCUMENTS

EP 1455434 A1 * 9/2004 ........... H02K 5/1735
EP 2710708 B1 8/2015
WO 2009057981 A2 5/2009
WO WO-2012156103 A2 * 11/2012 ........... H02K 1/2791

OTHER PUBLICATIONS

European Search Report dated Jun. 18, 2025 in connection with European Patent Application No. 25151031.9, 12 pages.

* cited by examiner

*Primary Examiner* — Jose A Gonzalez Quinones

(57) ABSTRACT

In accordance with at least one aspect of this disclosure, a composite rotor includes a first rotor portion defining a first rotational axis and having a first magnet therein and a second rotor portion defining a second rotational axis and having a second magnet therein. A stator portion is disposed radially between the first rotor portion and the second rotor portion. The first rotor portion and the second rotor portion are formed of composite filaments and/or composite tape, and the composite filaments and/or composite tape are wrapped in both a first direction and a second direction different from the first direction relative to the first and second rotation axes.

20 Claims, 5 Drawing Sheets

Fig. 1
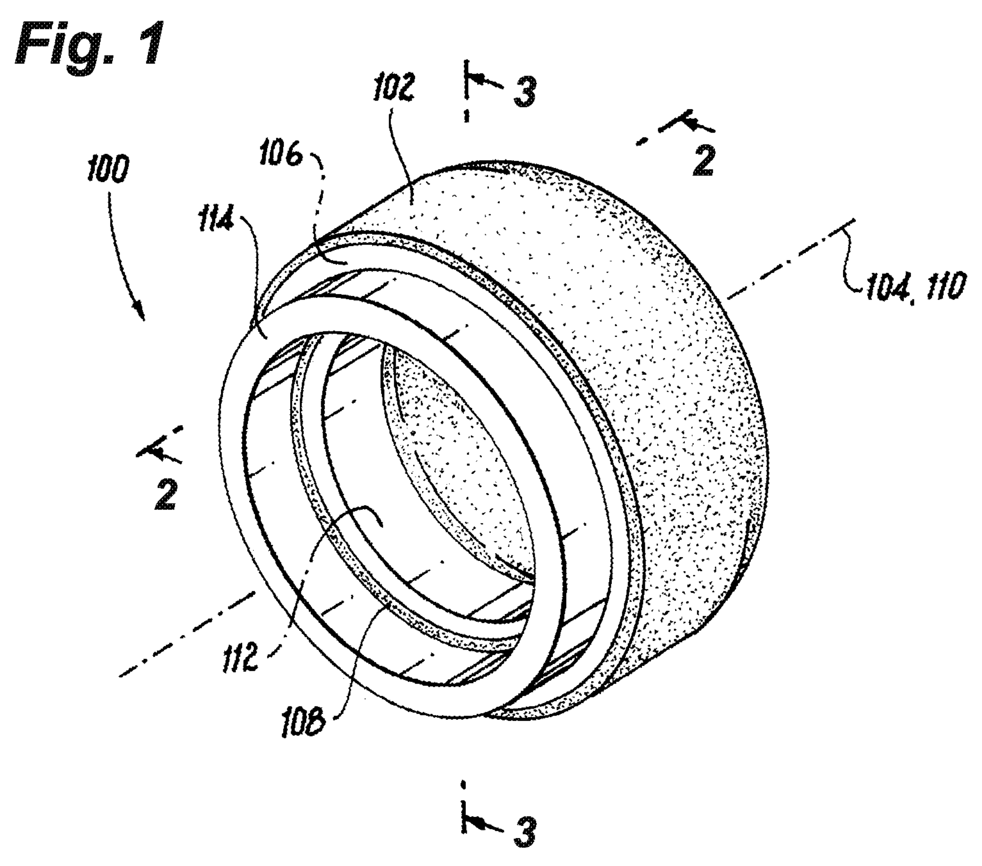
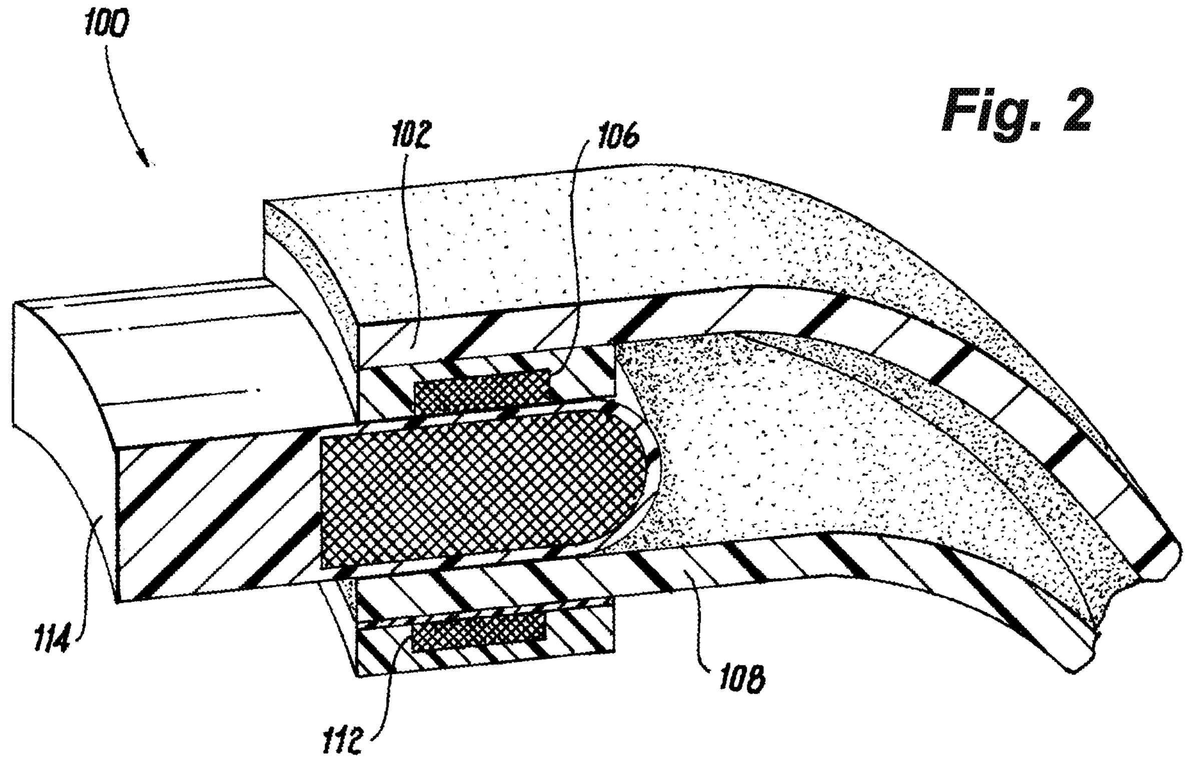

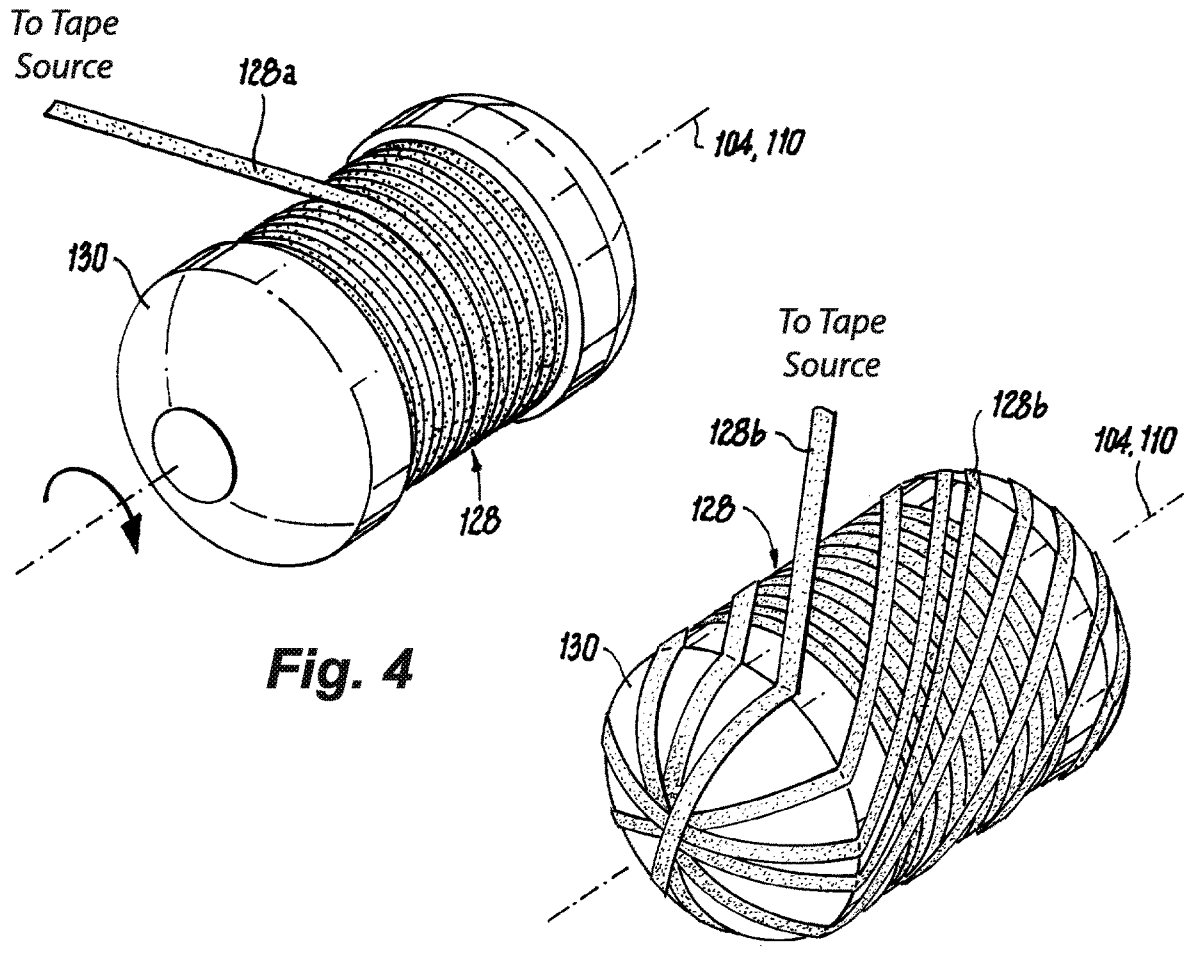
Fig. 4
Fig. 5
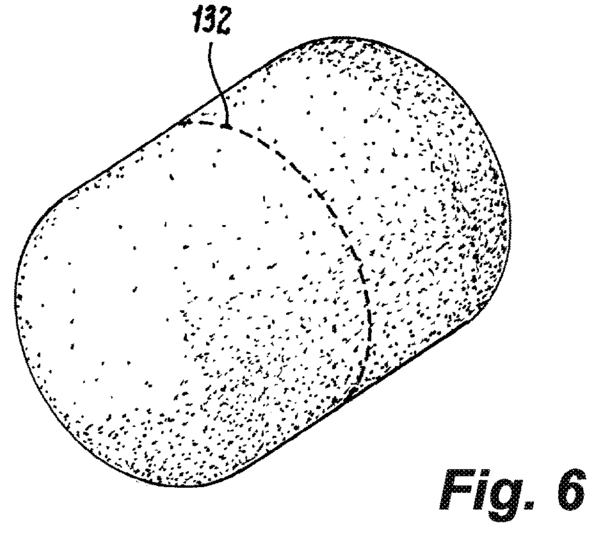
Fig. 6

102a
102
D1
102b
108a
108
D2

108b
102a
108a
106
112

100
102
108
114
134

200
249
206
250
212
252

COMPOSITE ROTORS AND METHODS OF MAKING COMPOSITE ROTORS

STATEMENT OF GOVERNMENT RIGHTS

This invention was made with government support under contract no. DE-AR0001351 awarded by the Department of Energy. The government has certain rights in the invention.

TECHNICAL FIELD

The present disclosure relates to rotors and more particularly to composite rotors.

BACKGROUND

Aviation-class electric propulsion motors must be ultra high-power dense while maintaining high efficiency. This can be achieved by maximizing torque at given speed. One of the key opportunities to achieve light weight is through replacing metal components with suitable lightweight composite structures.

The conventional techniques have been considered satisfactory for their intended purpose. However, there is an ever-present need for improved systems and methods for suitable lightweight motors with improved performance. This disclosure provides a solution for this need.

SUMMARY

In accordance with at least one aspect of this disclosure, a composite rotor includes a first rotor portion defining a first rotational axis and having a first magnet therein and a second rotor portion defining a second rotational axis and having a second magnet therein. A stator portion is disposed radially between the first rotor portion and the second rotor portion. The first rotor portion and the second rotor portion are comprised of composite filaments and/or composite tape, and the composite filaments and/or composite tape are wrapped in both a first direction and a second direction different from the first direction relative to the first and second rotation axes.

In embodiments, the second rotor portion can be radially inward of the first rotor portion such that the first rotational axis and the second rotational axis are co-axial. In certain embodiments, the composite filaments and/or composite tape includes thermoset or thermoplastic composite filaments and/or composite tape.

In embodiments, the first rotor portion can define a first u-shape in radial cross-section (i.e. in a plane extending radially from the first rotational axis) having a first straight section, a second straight section, and a rounded section extending between the first and second straight sections. In embodiments, the second rotor portion can define a second u-shape in radial cross-section, also having a first straight section, a second straight section, and a rounded section extending between the first and second straight sections. The second rotor portion can be disposed with the first rotor portion such that the rounded section of the second rotor portion sits within the rounded section of the first rotor portion, where a diameter of the second rotor portion can be smaller than a diameter of the first rotor portion.

In embodiments, the composite filaments and/or composite tape of the first rotor portion can be wrapped in the first direction relative to the first rotational axis in the first straight section and the second straight section and wrapped in the second direction relative to the first rotational axis, different from the first direction, in the rounded section. In certain embodiments, the first direction can be 900 relative to the first rotational axis, and the second direction can be angled relative to the first rotational axis at an angle greater than 0° and less than 90°.

In embodiments, the composite filaments and/or composite tape of the second rotor portion can be wrapped in the first direction relative to the second rotational axis in the second straight section and the second straight section and in the second direction relative to the second rotational axis, different from the first direction, in the rounded section. In certain embodiments, the first direction is 90° relative to the second rotational axis, and wherein the second direction is angled relative to the second rotational axis at an angle greater than 0° and less than 90°.

In accordance with at least one aspect of this disclosure, a method of making a composite rotor can include, placing a first grouping of composite filaments and/or composite tape on a first mandrel of a first diameter in a first direction relative to an axis of the first mandrel, placing a second grouping of composite filaments and/or composite tape on the first mandrel in a second direction relative to the axis of the first mandrel, the second direction being different from the first direction to form a first rotor portion, cutting the first rotor portion along a cut line perpendicular to the axis of the first mandrel into a first rotor portion first half and a first rotor portion second half and removing the first mandrel from the first rotor portion. If using a thermoset, the method can include setting the first and second groupings of composite filaments and/or composite tape before cutting.

The method can further include, placing a third grouping of composite filaments and/or composite tape on a second mandrel of a second diameter in a first direction relative to an axis of the second mandrel, placing a fourth grouping of composite filaments and/or composite tape on the second mandrel in a second direction relative to the axis of the second mandrel, the second direction being different from the first direction to form a second rotor portion, cutting the second rotor portion along a cut line perpendicular to the axis of the second mandrel into a second rotor portion first half and a second rotor portion first half, and removing the second mandrel from the second rotor portion. If using a thermoset, the method can include setting the third and fourth groupings of composite filaments and/or composite tape to form the second rotor portion before cutting.

The method can then include, inserting the second rotor portion first half into the first rotor portion first half, and inserting a first magnet within the first rotor portion first half, and a second magnet within the second rotor portion first half. The method can further include, inserting a stator into a space formed between the first rotor portion first half and the second rotor portion first half such that the stator is radially between the first rotor portion first half and the second rotor portion second half and radially between the first magnet and the second magnet.

In embodiments, placing the first grouping of composite filaments and/or composite tape on the first mandrel in the first direction can include wrapping the first grouping of composite filaments and/or composite tape around the first mandrel about the axis of the first mandrel such that the first grouping of composite filaments and/or composite tape are oriented 90° relative to the axis of the first mandrel, and placing the second grouping of composite filaments and/or composite tape on the first mandrel in the second direction includes wrapping the first grouping of composite filaments and/or composite tape on the first mandrel along the axis of the first mandrel but offset from the axis of the first mandrel such that the second grouping of composite filaments and/or composite tape are oriented and an angle relative to the axis of the first mandrel, wherein the angle is greater than 0° and less than 90°.

In embodiments, placing the third grouping of composite filaments and/or composite tape on the second mandrel in the first direction can include wrapping the first grouping of composite filaments and/or composite tape around the second mandrel about the axis of the second mandrel such that the third grouping of composite filaments and/or composite tape are oriented 90° relative to the axis of the second mandrel, and placing the fourth grouping of composite filaments and/or composite tape on the second mandrel in the second direction includes wrapping the fourth grouping of composite filaments and/or composite tape on the second mandrel along the axis of the second mandrel but offset from the axis of the second mandrel such that the fourth grouping of composite filaments and/or composite tape are oriented and an angle relative to the axis of the second mandrel, wherein the angle is greater than 0° and less than 90°.

In accordance with at least one aspect of this disclosure, a composite rotor includes, a first rotor portion defining a first rotational axis and having a first magnet therein, a second rotor portion defining a second rotational axis and having a second magnet therein, a stator portion disposed radially between the first rotor portion and the second rotor portion, wherein the first rotor portion and the second rotor portion are comprised of composite filaments and/or composite tape, and a third rotor portion extending between the first rotor portion and second rotor portion. The first rotor portion can define a first straight section, the second rotor portion can define a second straight section, and the third rotor portion can define a rounded section extending between the first and second straight section. The first magnet is disposed within the first straight section of the first rotor portion, the second magnet is disposed within the second straight section of the second rotor portion, and a third magnet is disposed within the rounded section of the third rotor portion.

In embodiments, the first rotor portion, the second rotor portion, and third rotor portion can define a "u" shaped structure in radial cross-section. In embodiments, a hub portion can be operatively connected to the second rotor portion to couple the "u" shaped structure to a shaft.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein:

FIG. 1 is a partial, cross-sectional perspective view of a motor in accordance with this disclosure, showing a rotor and a stator;

FIG. 2 is a partial, cross-sectional perspective view of the motor of FIG. 1, wherein the stator has been removed;

FIG. 4 is a perspective view of a method of making a rotor, showing placement of composite filaments and/or composite tape onto a mandrel;

FIG. 5 is a perspective view of a method of making a rotor, showing placement of additional composite filaments and/or composite tape onto the mandrel shown in FIG. 4;

FIG. 6 is a perspective view of a method of making a rotor, showing a curing step;

DETAILED DESCRIPTION

Figure 3:
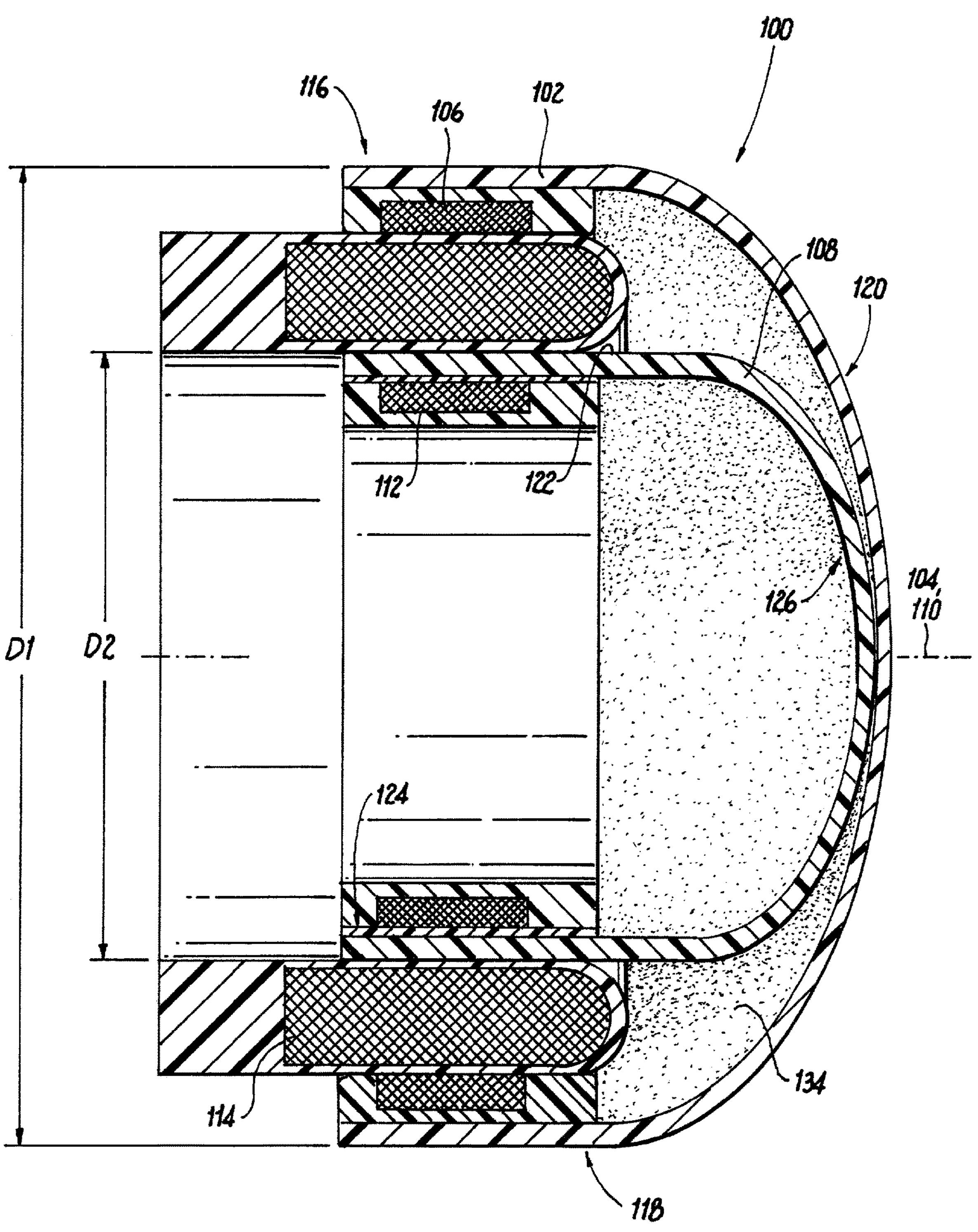
FIG. 3 is a cross-sectional view of the motor of FIG. 1, showing a first rotor portion and a second rotor portion, and a stator included therebetween.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-11.

In accordance with at least one aspect of this disclosure, such as shown in FIGS. 1-3, a composite rotor 100 can include a first rotor portion 102 defining a first rotational axis 104 and having a first magnet 106 therein and a second rotor portion 108 defining a second rotational axis 110 and having a second magnet 112 therein. A stator portion 114, shown in FIGS. 1 and 3, can be disposed radially between the first rotor portion 102 and the second rotor portion 108. In embodiments, as shown, the second rotor portion 108 can be radially inward of the first rotor portion 102 such that the first rotational axis 104 and the second rotational axis 110 are co-axial. In certain embodiments, The first rotor portion 102 and the second rotor portion 108 can be comprised of composite filaments and/or composite tape, and the composite filaments and/or composite tape can be wrapped in both a first direction and a second direction (different from the first direction) relative to the first and second rotation axes 104, 110. This will be discussed further below. In certain embodiments, the composite filaments and/or composite tape includes thermoset or thermoplastic composite filaments and/or composite tape.

Referring now to FIG. 3, in embodiments, the first rotor portion 102 can define a first u-shape in radial cross-section (i.e., in a plane extending radially from the first rotational axis 104) having a first straight section 116, a second straight section 118, and a rounded section 120 extending between the first and second straight sections 116, 118. In embodiments, the second rotor portion can similarly define a second u-shape in radial cross-section (i.e., in a plane extending radially from the second rotational axis 110), also having a first straight section 122, a second straight section 124, and a rounded section 126 extending between the first and second straight sections 122, 124. As shown, the second rotor portion 108 can be disposed with the first rotor portion 102 such that the rounded section 126 of the second rotor portion 108 sits within the rounded section 120 of the first rotor portion 102, where a diameter D2 of the second rotor portion 108 is smaller than a diameter D1 of the first rotor portion 102.

With reference now to FIGS. 3-7, in embodiments, the composite filaments and/or composite tape 128 of the first rotor portion 102 can be wrapped in the first direction relative to the first rotational axis in the first straight section 116 and the second straight section 118. The composite filaments and/or composite tape 128 can also be wrapped in the second direction relative to the first rotational axis, in the rounded section 120. In certain embodiments, the first direction can be 90° (or thereabout) relative to the first rotational axis 104, and the second direction can be angled relative to the first rotational axis 104 at an angle θ greater than 0° and less than 90°, for example between 20° and 60°. Like the first rotor portion 102, the composite filaments and/or composite tape of the second rotor portion 108 can be wrapped in the first direction on the straight sections 122, 124, and in the second direction on the rounded section 126, the first direction being 90° (or thereabout) relative to the second rotational axis 110, and the second direction being angled relative to the second rotational 110 axis at an angle θ greater than 0° and less than 90°, for example between 20° and 60°. The angle of the filaments relative to the axis can be selected to reduce cantilever effect as appreciated by one having ordinary skill in the art in view of this disclosure.

Figures 7, 8, 9:
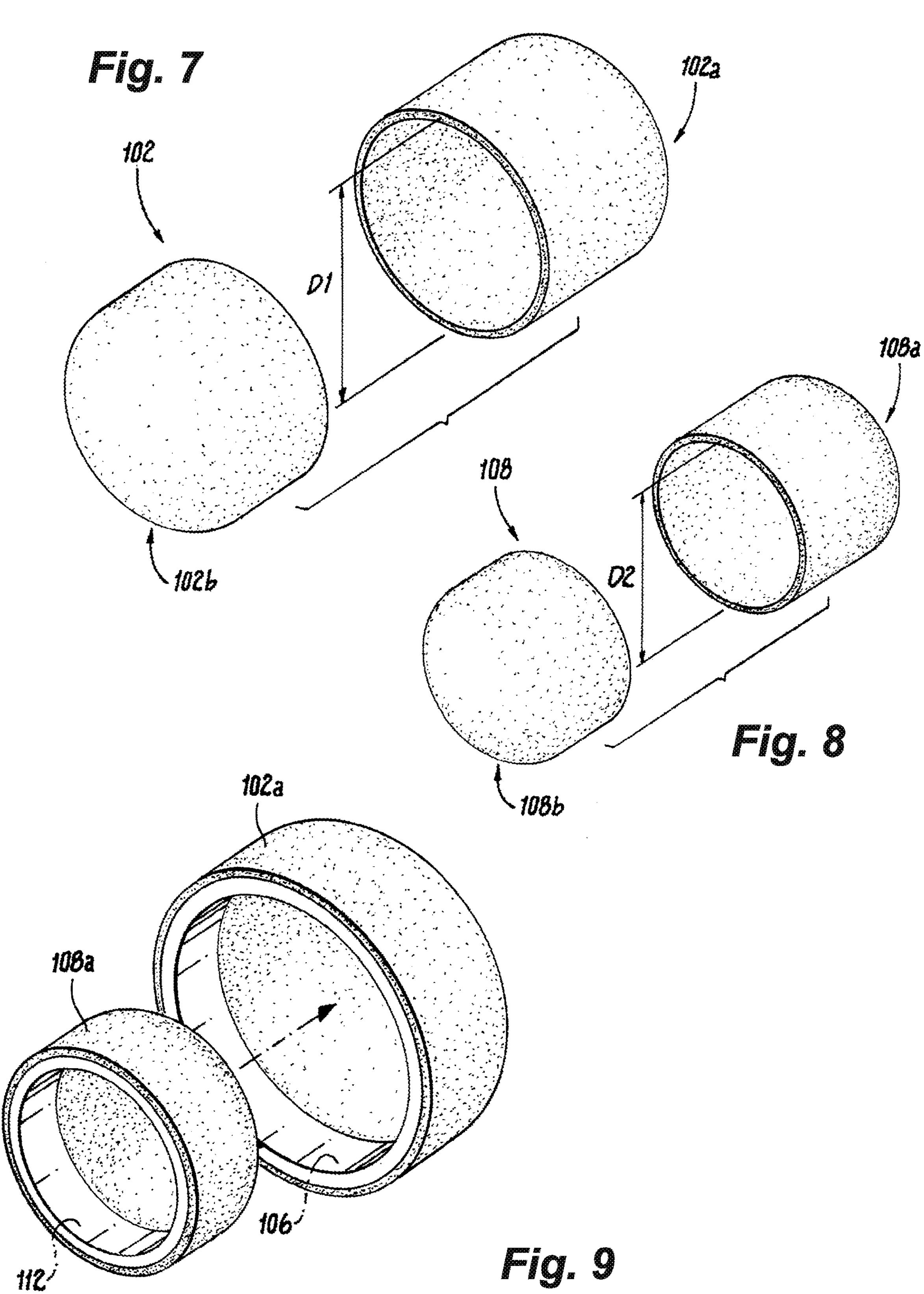
FIGS. 7 to 10 show a method of assembly of a rotor made by the method shown in FIGS. 4-6.

In accordance with at least one aspect of this disclosure, and shown in FIGS. 4-10 a method of making a composite rotor (e.g., rotor 100), can include, placing a first grouping 128*a* of composite filaments and/or composite tape on a first mandrel 130 of a first diameter D1 in the first direction relative to an axis of the first mandrel 130 (e.g., coaxial with axis 104) as shown in FIG. 4 and the placing a second grouping 128*b* of composite filaments and/or composite tape on the first mandrel 130 (e.g., on top of the first grouping) in the second direction relative to the axis of the first mandrel 130 as shown in FIG. 5. The method can then include setting or curing the first and second groupings 128*a*, 128*b* of composite filaments and/or composite tape to form the first rotor portion 102 if thermoset resins are used for the filaments or tapes. Once cured the method can include cutting the first rotor portion 102 along a cut line 132 perpendicular to the axis of the first mandrel and removing the first mandrel 130 from first rotor portion 102 to arrive at a first rotor portion first half 102*a* and a first rotor portion second half 102*b* as shown in FIGS. 6 and 7.

The second rotor portion 108 can be made in a similar manner as the first rotor portion 102, as shown in FIGS. 3-6 (and once the second rotor portion is cured/set if using a thermoset) the method can include cutting the second rotor portion 108 along a cut line (e.g., cut 132) perpendicular to the axis of a second mandrel into a second rotor portion first half 108*a* and a second rotor portion second half 108*b* as shown in FIG. 8. The difference in forming the second rotor portion 108 from forming the first rotor portion 102, is that the second mandrel has a diameter smaller than the first mandrel 130.

After forming the first rotor portion 102 and second rotor portion 108, the method can then include, as shown in FIG. 9, inserting the second rotor portion first half 108*a* into the first rotor portion first half 102*a*. A second composite rotor can be assembled using the remaining half of the first portion 102 and second portion 108 using the same method described herein. The method can then include inserting a first magnet 106 within the first rotor portion first half 102*a*, and a second magnet 112 within the second rotor portion first half 108*a*. The method can further include, as shown in FIG. 10, inserting the stator 114 into a space 134 formed between the first rotor portion 102 and the second rotor portion 108 such that the stator 114 is radially between the first rotor portion 102 and the second rotor portion 108 and radially between the first magnet 106 and the second magnet 112.

Embodiments can include an ultra-high-power dense motor suitable for use in aircraft application and having high efficiency. Traditional rotors in such applications may be metallic, which can reduce efficiency and be heavier than desired. Accordingly, embodiments disclosed herein include improved rotors made of composite materials, increasing efficiency and reducing weight. Embodiments of the rotor include co-axially located, dual U-shaped composite structure. At high-speed rotation, the straight section of the outer U structure holds the outer permanent magnets while the straight section of the inner U structure holds the inner permanent magnets. The magnets in the rotor can be or include Neodymium or Samarium Cobalt magnets.

In embodiments, the U shape can be generated with thermoset filament/tape winding or thermoplastic tape winding. The fiber architecture of the straight section can be hoop dominated to withstand the centrifugal force from the heavy magnets, hoop meaning the filaments are oriented about the rotational axis of the rotor (90° relative to the rotational axis). The fiber architecture of the dome section of U structure can be placed in a way to minimize the cantilever effect, for example, angled relative to the rotational axis, but less than 90°. Such fiber placement can still support the structure during high-speed rotation due to centrifugal force and will also reduce bending in the U regions to prevent interference between the first and second rotor portions, and the stator. In embodiments, thermoset filament/tape winding or thermoplastic tape winding can be or include high specific strength and stiffness carbon fiber composites. In certain embodiments, such as shown in FIGS. 1-10, there can be no magnets in the U portion of the rotor.

Figures 10, 11:
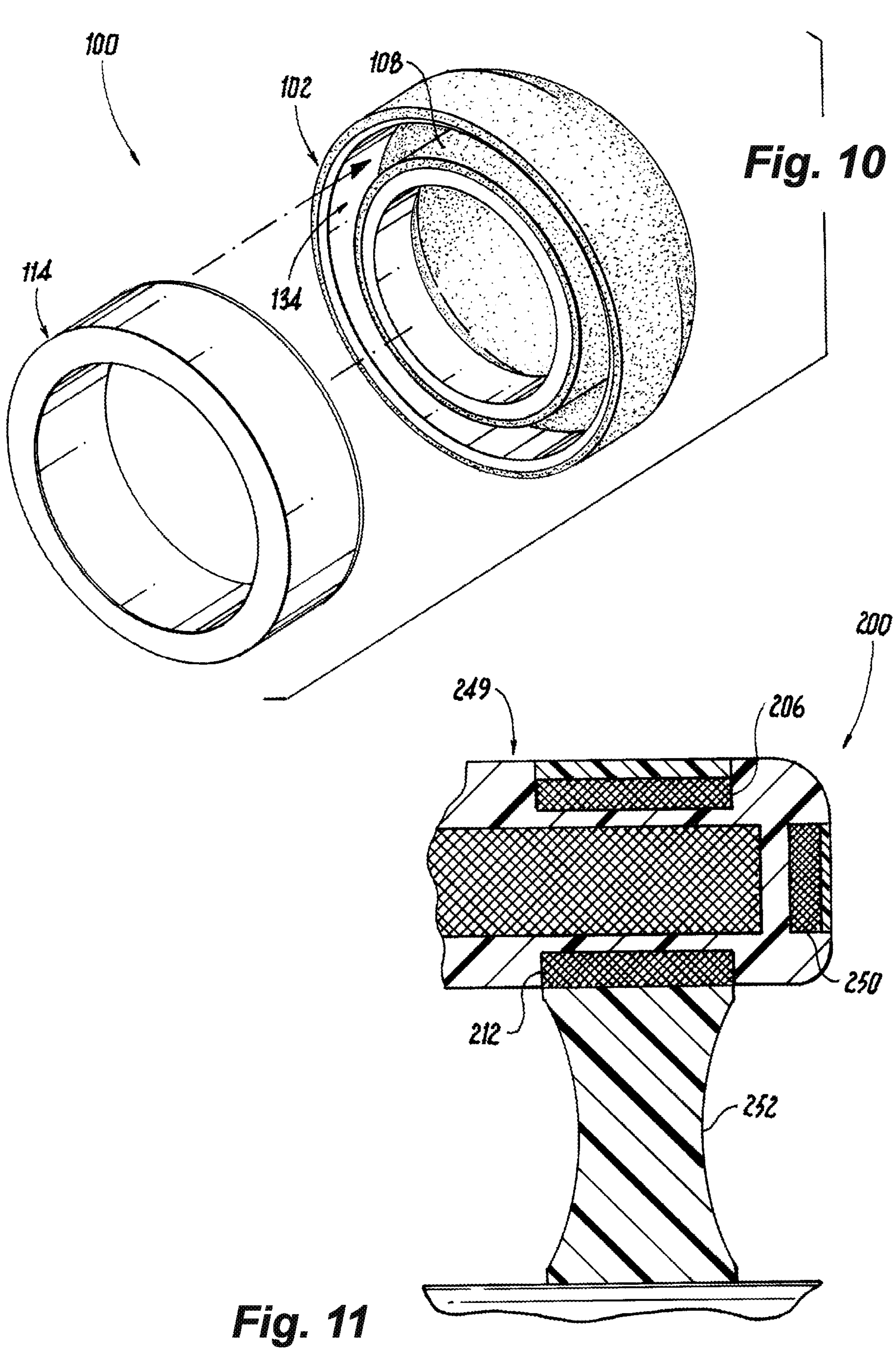
FIG. 11 is a partial, cross-sectional view of another motor of, showing another embodiment of a rotor.

In certain embodiments, such as shown in FIG. 11, the rotor 200 can include a U-shaped composite structure 249 where all three sides the U-shape can include permanent magnets 206, 212, 250, such as neodymium and samarium cobalt. In such embodiments the fiber architecture can be individually designed for each section of the U shape, for example, the 2 straight sections and the dome section, to withstand the centrifugal force at their specific locations. A hub 252 composite structure can be to connect the U-shaped 249 structure to a shaft. Flexible thermoset-based composite prepreg can be placed for all the U sections 249 and the hub 252. The entire structure can then be co-cured. Alternatively, in certain embodiments, thermoplastic-based composites can be pressed and welded to form the structure.

Embodiments of the composite structure disclosed herein can be compact, lightweight, well-suited for weight/space-sensitive applications such as aircraft electrification motors and generators. The fiber architecture can be readily tailored to meet the high-speed rotor design requirements as appreciated by one having ordinary skill in the art in view of this disclosure, as well as resisting high centrifugal load, and minimizing cantilever effects.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A composite rotor, comprising:

a first rotor portion defining a first rotational axis and having a first magnet therein;

a second rotor portion defining a second rotational axis and having a second magnet therein; and a stator portion disposed radially between the first rotor portion and the second rotor portion, wherein the first rotor portion and the second rotor portion are comprised of composite filaments and/or composite tape, wherein the composite filaments and/or composite tape are wrapped in both a first direction and a second direction different from the first direction relative to the first rotation axis and the second rotation axis, wherein the first rotor portion defines a first u-shape in radial cross-section having a first straight section, a second straight section, and a rounded section extending between the first and second straight sections, wherein the second rotor portion defines a second u-shape in radial cross-section having a first straight section, a second straight section, and a rounded section extending between the first and second straight sections, and wherein the second rotor portion is disposed with the first rotor portion such that the rounded section of the second rotor portion sits within the rounded section of the first rotor portion.

2. The rotor of claim 1, wherein the second rotor portion is radially inward of the first rotor portion such that the first rotational axis and the second rotational axis are co-axial.

3. The rotor of claim 1, wherein a diameter of the second rotor portion is smaller than a diameter of the first rotor portion.

4. The rotor of claim 1, wherein the first magnet is disposed within the first straight section and second straight section of the first rotor portion.

5. The rotor of claim 4, wherein the composite filaments and/or composite tape of the first rotor portion are wrapped in the first direction relative to the first rotational axis in the first straight section and the second straight section, and in the second direction relative to the first rotational axis, different from the first direction, in the rounded section.

6. The rotor of claim 5, wherein the first direction is 90° relative to the first rotational axis, and wherein the second direction is angled relative to the first rotational axis at an angle greater than 0° and less than 90°.

7. The rotor of claim 1, wherein the second magnet is disposed within the first straight section and second straight section of the second rotor portion.

8. The rotor of claim 7, wherein the composite filaments and/or composite tape of the second rotor portion are wrapped in the first direction relative to the second rotational axis in the first straight section and the second straight section, and in the second direction relative to the second rotational axis, different from the first direction, in the rounded section.

9. The rotor of claim 8, wherein the first direction is 90° relative to the second rotational axis, and wherein the second direction is angled relative to the second rotational axis at an angle greater than 0° and less than 90°.

10. The rotor of claim 1, wherein:

the composite filaments and/or composite tape of the first rotor portion are wrapped in the first direction relative to the first rotational axis in the first straight section and the second straight section, and in the second direction relative to the first rotational axis, different from the first direction, in the rounded section, wherein the composite filaments and/or composite tape of the second rotor portion are wrapped in the first direction relative to the second rotational axis in the second straight section and the second straight section, and in the second direction relative to the second rotational axis, different from the first direction, in the rounded section.

11. The rotor of claim 10, wherein the first direction is 90° relative to the first rotational axis, and wherein the second direction is angled relative to the first rotational axis at an angle greater than 0° and less than 90°, wherein the first direction is 90° relative to the second rotational axis, and wherein the second direction is angled relative to the second rotational axis at an angle greater than 0° and less than 90°.

12. The rotor of claim 1, wherein the composite filaments and/or composite tape includes thermoset or thermoplastic composite filaments and/or composite tape.

13. A method of making a composite rotor, comprising, placing a first grouping of composite filaments and/or composite tape on a first mandrel of a first diameter in a first direction relative to an axis of the first mandrel;

placing a second grouping of composite filaments and/or composite tape on the first mandrel in a second direction relative to the axis of the first mandrel, the second direction being different from the first direction to form a first rotor portion having a first u-shape in radial cross-section having a first straight section, a second straight section, and a rounded section extending between the first and second straight sections;

cutting the first rotor portion along a cut line perpendicular to the axis of the first mandrel into a first rotor portion first half and a first rotor portion second half and removing the first mandrel from the first rotor portion to form the first rotor portion;

placing a third grouping of composite filaments and/or composite tape on a second mandrel of a second diameter in a first direction relative to an axis of the second mandrel;

placing a fourth grouping of composite filaments and/or composite tape on the second mandrel in a second direction relative to the axis of the second mandrel, the second direction being different from the first direction to from a second rotor portion having a second u-shape in radial cross-section having a first straight section, a second straight section, and a rounded section extending between the first and second straight sections;

cutting the second rotor portion along a cut line perpendicular to the axis of the second mandrel into a second rotor portion first half and a second rotor portion second half and removing the second mandrel from the second rotor portion; and inserting the second rotor portion first half into the first rotor portion first half such that the rounded section of the second rotor portion sits within the rounded section of the first rotor portion.

14. The method of claim 13, further comprising, inserting a first magnet within the first rotor portion first half, and a second magnet within the second rotor portion first half.

15. The method of claim 14, further comprising, inserting a stator into a space formed between the first rotor portion first half and the second rotor portion first half such that the stator is radially between the first rotor portion first half and the second rotor portion first half and radially between the first magnet and the second magnet.

16. The method of claim 13, wherein:

placing the first grouping of composite filaments and/or composite tape on the first mandrel in the first direction includes wrapping the first grouping of composite filaments and/or composite tape around the first mandrel about the axis of the first mandrel such that the first grouping of composite filaments and/or composite tape are oriented 90° relative to the axis of the first mandrel;

placing the second grouping of composite filaments and/or composite tape on the first mandrel in the second direction includes wrapping the first grouping of composite filaments and/or composite tape on the first mandrel along the axis of the first mandrel but offset from the axis of the first mandrel such that the second grouping of composite filaments and/or composite tape are oriented and an angle relative to the axis of the first mandrel, wherein the angle is greater than 0° and less than 90°;

placing the third grouping of composite filaments and/or composite tape on the second mandrel in the first direction includes wrapping the first grouping of composite filaments and/or composite tape around the second mandrel about the axis of the second mandrel such that the third grouping of composite filaments and/or composite tape are oriented 90° relative to the axis of the second mandrel; and placing the fourth grouping of composite filaments and/or composite tape on the second mandrel in the second direction includes wrapping the fourth grouping of composite filaments and/or composite tape on the second mandrel along the axis of the second mandrel but offset from the axis of the second mandrel such that the fourth grouping of composite filaments and/or composite tape are oriented and an angle relative to the axis of the second mandrel, wherein the angle is greater than 0° and less than 90°.

17. A composite rotor, comprising:

a first rotor portion defining a first rotational axis and having a first magnet therein;

a second rotor portion defining a second rotational axis and having a second magnet therein, wherein the first rotor portion and the second rotor portion are comprised of composite filaments and/or composite tape; and a stator portion disposed radially between the first rotor portion and the second rotor portion, wherein the first rotor portion defines a first u-shape in radial cross-section having a first straight section a second straight section, and a rounded section extending between the first and second straight sections, wherein the second rotor portion defines a second u-shape in radial cross-section having a first straight section, a second straight section and a rounded section extending between the first and second straight sections, and wherein the second rotor portion is disposed with the first rotor portion such that the rounded section of the second rotor portion sits within the rounded section of the first rotor portion, and wherein a third magnet is disposed between the rounded section of the first rotor portion and the stator portion.

18. The composite rotor of claim 17, wherein the first rotor portion and the second rotor portion define a "u" shaped structure in radial cross-section.

19. The composite rotor of claim 18, further comprising a hub portion operatively connected to the second rotor portion to couple the "u" shaped structure to a shaft.

20. The composite rotor of claim 18, wherein the second rotor portion is radially inward of the first rotor portion such that the first rotational axis and the second rotational axis are co-axial.

* * * * *